United States Patent
Parnet

[15] 3,664,520
[45] May 23, 1972

[54] HANDLING AND TRANSFERRING DEVICE FOR PLANE OBJECTS, PARTICULARLY GLASS SHEETS

[72] Inventor: Bernard Parnet, Courbevoie, France

[73] Assignee: Compagnie de Saint-Gobain, Neuilly-sur-Seine, France

[22] Filed: Jan. 21, 1970

[21] Appl. No.: 4,547

[30] Foreign Application Priority Data

Jan. 22, 1969   France.................................6901146

[52] U.S. Cl..................................214/7, 214/1 BT, 214/1 Q
[51] Int. Cl.......................................................B65g 67/00
[58] Field of Search..............................214/7, 1 S, 1 R, 1 BS

[56] References Cited

UNITED STATES PATENTS

| | | | |
|---|---|---|---|
| 1,741,026 | 12/1929 | Koupal et al. | 214/1 BS X |
| 1,761,199 | 6/1930 | Drake | 214/1 S X |
| 2,049,850 | 8/1936 | Lytle et al. | 214/1 BS |
| 3,178,041 | 4/1965 | Wheat | 214/7 |
| 3,279,664 | 10/1966 | Lynch | 214/7 X |

FOREIGN PATENTS OR APPLICATIONS 1,180,681   10/1964   Germany.................................214/7

Primary Examiner—Gerald M. Forlenza
Assistant Examiner—Frank E. Werner
Attorney—Dale A. Bauer, John L. Seymour and Bauer and Seymour

[57] ABSTRACT

A method for the handling of flat articles and the transfer of these articles from one supporting means to another. More precisely, a device permitting the transfer of flat articles from a feeding carrier to a removable support on which the articles are piled from separate and individual pieces without damage into suitable shipping cases or the like as desired.

6 Claims, 8 Drawing Figures

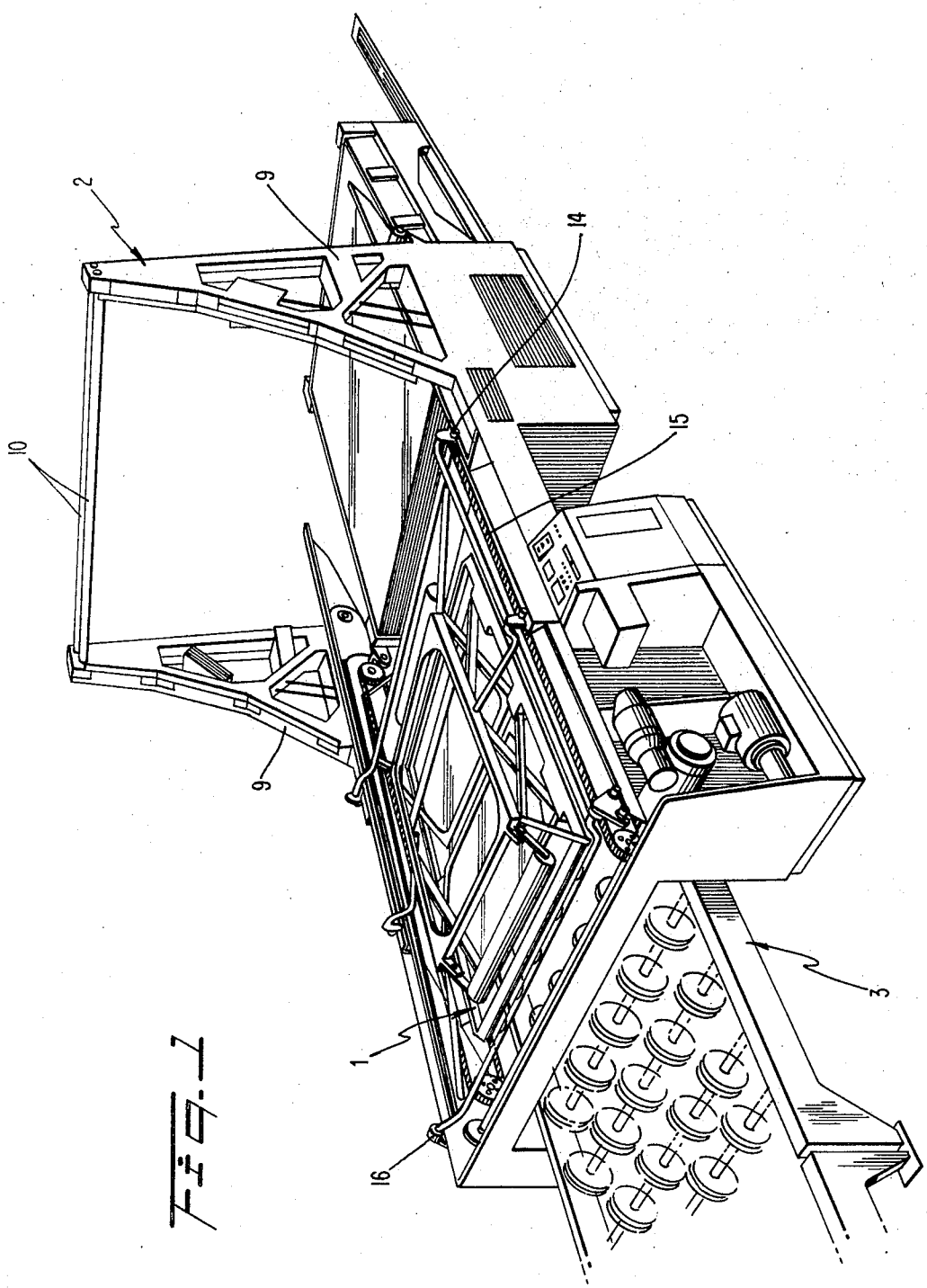

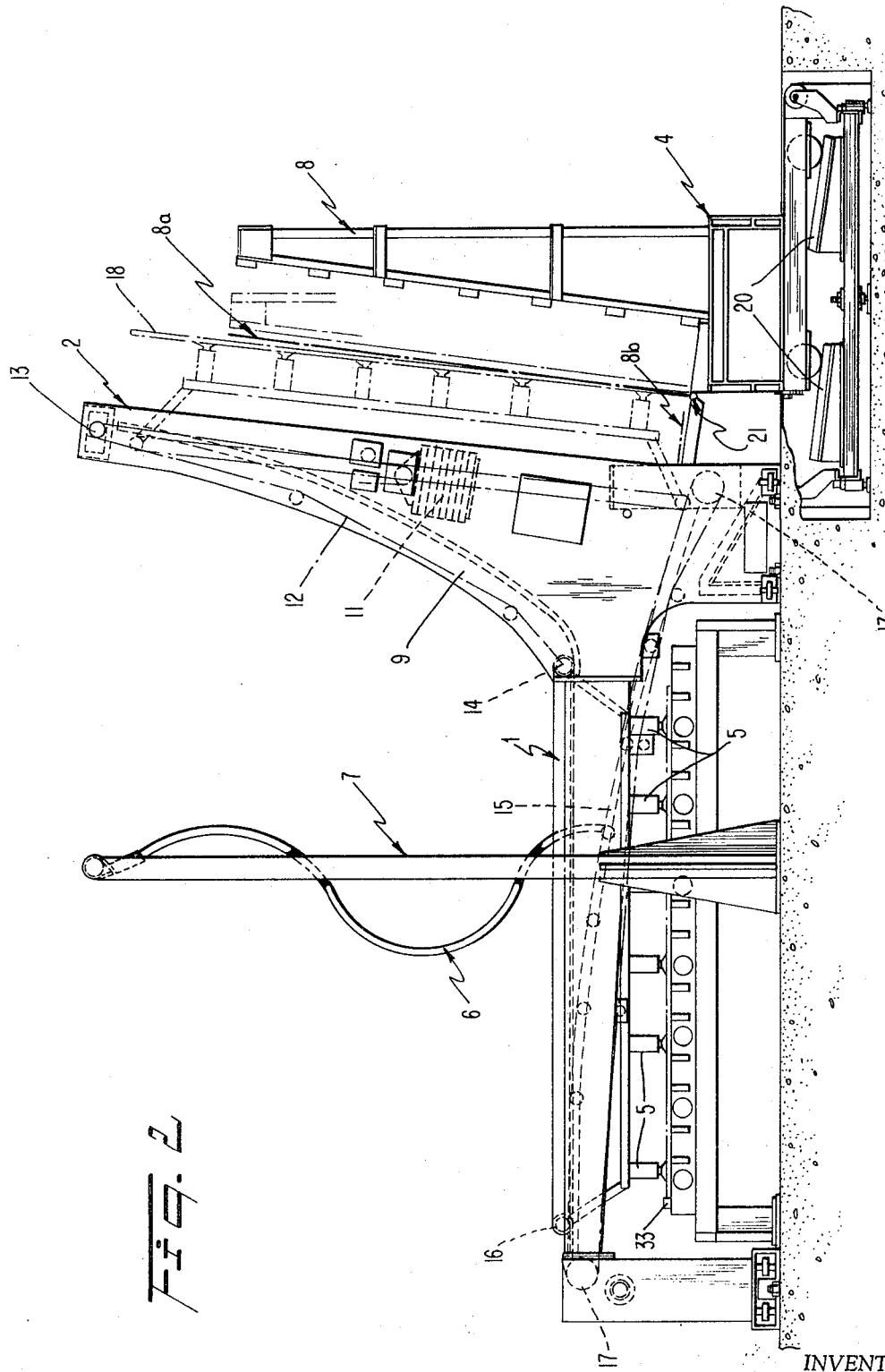

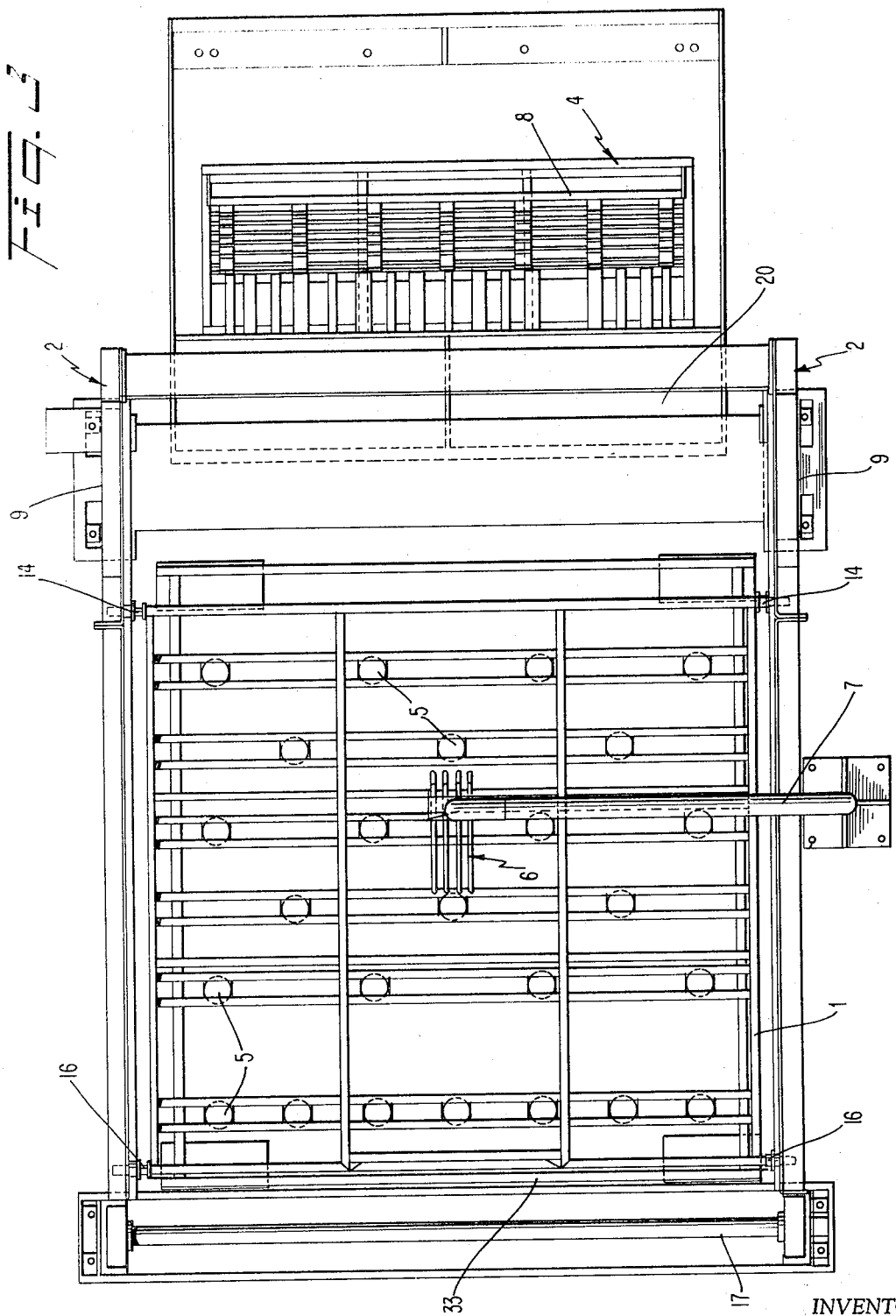

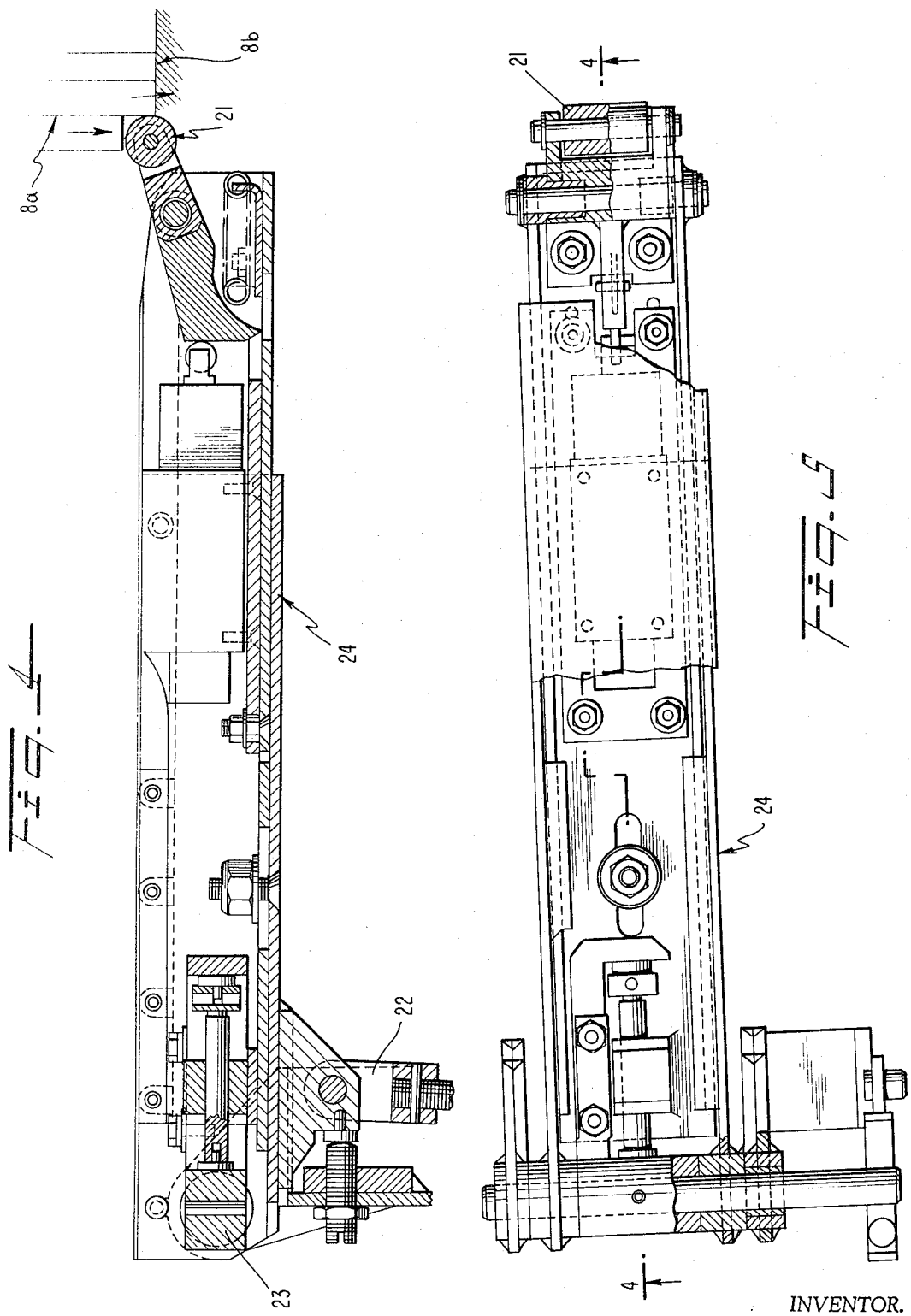

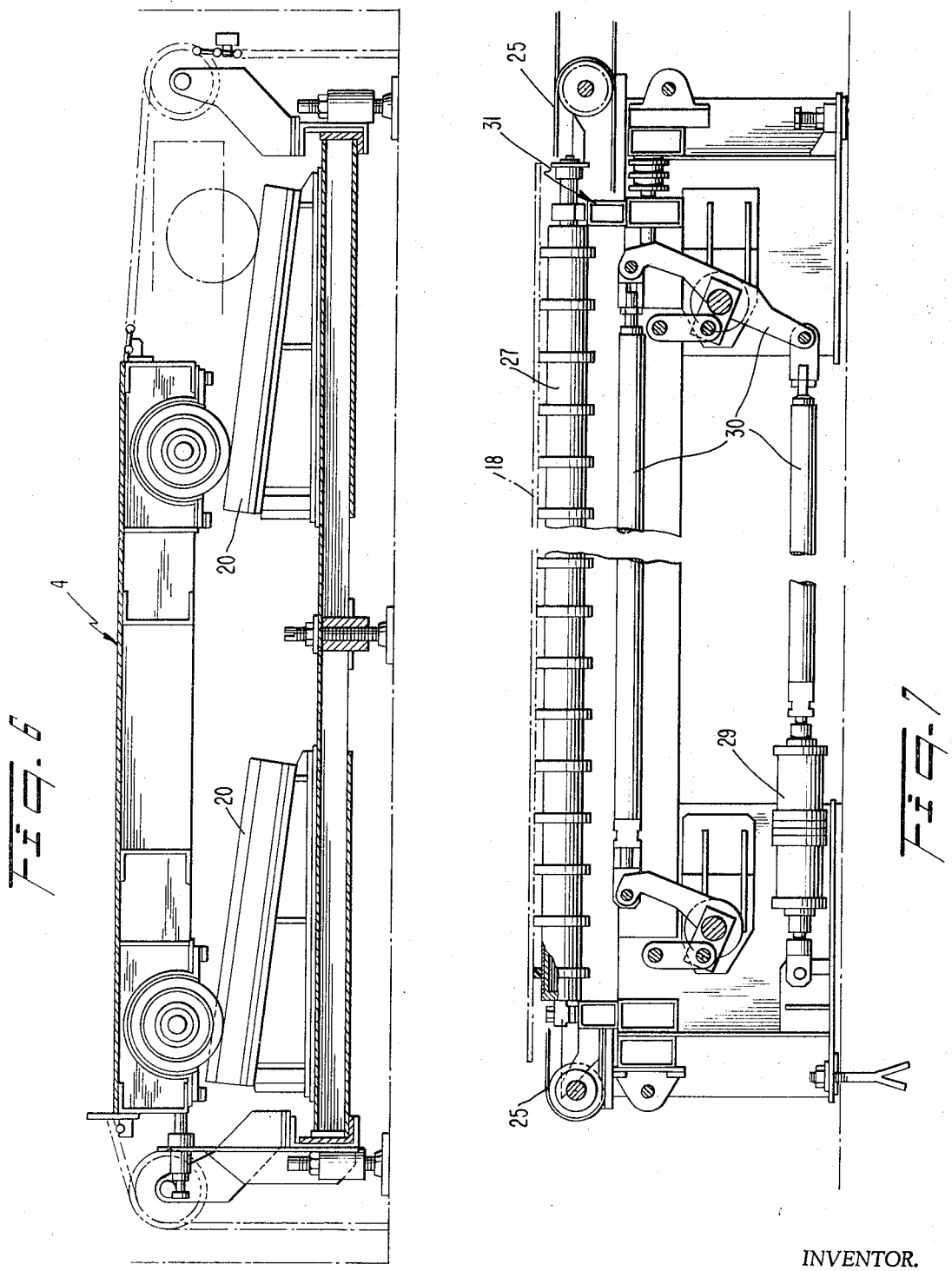

INVENTOR.
BERNARD PARNET

HANDLING AND TRANSFERRING DEVICE FOR PLANE OBJECTS, PARTICULARLY GLASS SHEETS

The invention concerns a device for the handling of flat articles and the transfer of these articles from one support to another. More particularly the object is to provide a device for the transfer of flat articles from a feeding carrier, or conveyor to a movable support, on which the said articles are piled in sequence.

The invention is of particular utility in the handling of glass sheets during or after their manufacture.

After a glass strip or ribbon has been completed it is cut into sheets of suitable dimensions, and these sheets are brought by conveyors to a location where they are packed for storage or shipment. The sheets of glass must be transferred at that location from the conveyor to handling means on which they are stacked, either horizontally, as for example when they are placed in packing cases, or are emplaced in a position resting on one edge and slightly inclined from the vertical. In the latter case, the handling means may comprise a wheeled truck known generally as a "desk," whereon the sheets are sequentially placed and supported in nearly vertical position, with their lower edges resting upon a sole plate. When the desk has been thus loaded to capacity, it is rolled to any selected or desired location for packing or for further treatment of the sheets.

It is important that the aforesaid sequential transfer of sheets from the conveyor to the handling means or desk be carried out rapidly and that it be synchronized with the arrival of the sheets at the delivery end of the conveyor. The sheets must, however, be stacked precisely and handled with care, for, at the moment the sheet is placed on the stack or desk, for example, excessive relative motion between the glass sheet being deposited and the next preceding emplaced sheet in contact must be avoided, because excessive relative movements may effect marring or scratching of their surfaces. It is for this reason that in prior art devices it is usually necessary to interpose spacer strips or slats between the sheets, unless they have rounded or ground edges.

The present invention effects transfer of sheets from a conveyor to a handling means or desk, rapidly and with the required degree of precision.

The device in accordance with the invention consists essentially of the following combination:

a. means for successively bringing each of the said flat objects to a first fixed position, or starting position;

b. a mobile frame equipped with suction cups connected to a source of suction;

c. a rigid framework providing means of guiding the same frame;

d. means for moving the frame on the framework, on the one hand from the starting position, where it attaches to each of the sheets, in succession, by means of the suction cups, to a second delivery position, where it deposits the transported object onto a stack of similar objects carried by a mobile support. The invention may also be used to remove sheets one by one from a stack, and deposit them in sequence onto a conveyor;

e. means for displacing the handling means after each sheet is depositied thereon, by a distance equal to the thickness of the sheet, to thereby position the handling means for reception of the next sheet to be emplaced.

More particularly, the device according to the invention consists of:

a. a carrier or conveyor, delivering flat sheets in horizontal successively to an initial or starting position and with one reference edge of each accurately located, b. a movable storage desk, c. a fixed framework, carrying a mobile frame equipped with suction cups and means guiding the frame in such a way that the reference edge of the sheet passes along with the carrier pivots about the reference edge to an essentially vertical position over the desk, d. means to move the frame on the framework, on the one hand from the starting position where it adheres to each of the sheets on its upper surface by means of suction cups to a depositing position slightly inclined from the vertical where it deposits the sheet upright on a stack of similar sheets carried by the mobile desk, from the depositing position to the starting position after the article is deposited. As will later appear, the apparatus is also operable to remove sheets one by one from a stack thereof and to deposit each, in turn, upon a conveyor.

e. means to displace the desk by the thickness of the sheets with respect to the framework during each complete cycle of movement of the said frame, while the supporting face of the sole-piece remains in a fixed plane passing through the arrival position of the reference edge of the said sheets. Numerous other uses and modes of operation of the invention will become clear to those skilled in the art, after a study of the following detailed description, which should be taken in an illustrative rather than a limiting sense.

In the embodiment shown, the means bringing the flat objects—in this instance, glass sheets—to the starting position include an auxiliary feeding conveyor arranged at the end of the principal carrier and position below the frame bearing the suction cups when the frame is in the starting position. This auxiliary conveyor consists of a plurality of carrying belts between which there are arranged rollers which may be raised by a jack to the starting position, carrying one of the said objects, brought by the said rollers to just below the said frame.

Also, in this embodiment, the frame is guided by rollers rolling on rails of suitable profile and the truck is carried from the said starting position to the arrival position by endless chains which are themselves actuated by a hydraulic motor, but different means of guiding and carrying could naturally be used.

In this embodiment, the glass sheets are deposited by the nozzle frame on a desk, the latter being mounted in a mobile fashion on rails inclined to the horizontal by an angle equal to the inclination of the sole-piece which receives the sheets on their edge, so that a hydraulic jack suffices to displace the desk on rails for a distance corresponding to the thickness of a glass sheet, the said jack being controlled by a signal for example from a sensor forming part of the framework which is actuated by the edge of the sheet deposited on the stack. It would be possible, however, without exceeding the bounds of the invention, to use other means of control or carrying, in particular to combined vertical displacement of the frame with a horizontal displacement of the framework.

Other characteristics and advantages of the invention will appear more clearly in the following detailed description of this embodiment, referring to the attached drawings. In these drawings:

FIG. 1 is a perspective view of the invention located to receive sheets from a conveyor and operating to emplace the sheets horizontally to form a stack as, for example, on a pallet;

FIG. 2 is a side elevation showing the invention operating to deliver sheets in sequence in edge-supported essentially vertical position upon a desk, and showing mechanism to retract the desk after each sheet is deposited thereon, by a distance equal to the thickness of the sheet;

FIG. 3 is a plan view of the apparatus depicted upon FIG. 2;

FIG. 4 is a detail vertical sectional view showing to an enlarged scale the means for controlling the step-by-step retraction of the movable desk;

FIG. 5 is a plan view of the mechanism of FIG. 4, and partly broken away to show details otherwise concealed;

FIG. 6 is a vertical section to an enlarged scale over FIG. 2, showing details of the base of the desk and means supporting and guiding it in translation;

FIG. 7 is an end elevation of the mechanism by which each sheet is accurately positioned prior to contact by the suction cup assembly.

Figure 8:
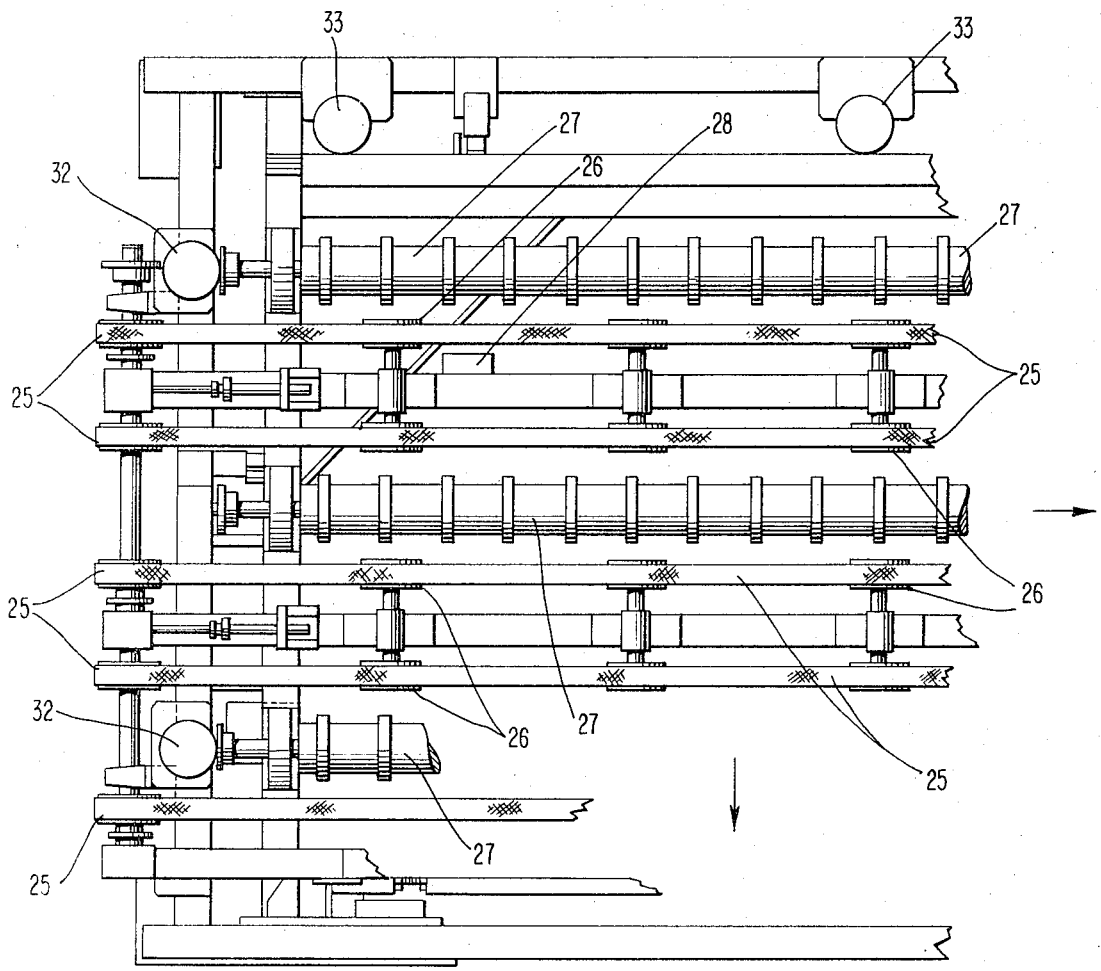
FIG. 8 is a plan view to about the same scale as FIG. 7, of a portion of the mechanism thereof.

Referring to FIGS. 1 and 2:

The transfer device comprises a suction cup carrying truck, 1, a framework to guide this truck, 2, a system to convey glass sheets, 3, successively to a well-defined position below the truck, 1, and a base 4 carrying a desk, 8, on which the truck, 1, successively deposits each of the glass sheets.

The truck, 1, is of a known type. The suction cups, 5, with which it is equipped make it possible to attach the glass sheets with which they are in contact by connecting the suction cups with a source of vacuum. For this purpose, the cups, 5, are connected by a flexible tube, 6, carried by a support, 7, with a source of vacuum (not shown). The desk 8 forms a square the front of which, at the start of a loading operation is located at 8a and, as shown, is slightly inclined from the vertical.

The framework, 2, guides the truck, 1, as it is displaced by means which will be described below in detail so that it moves to a position slightly inclined from the vertical and parallel to the inclined face of the desk, 8, consists of a construction comprising for example two vertical columns of 9 welded together and rigidly interconnected joined at their top by cross-pieces, 10, FIG. 1.

Within each of the vertical assemblies, 9, there is a counterweight, 11, FIG. 2, attached to the end of the truck, 1, juxtaposed to the base of the construction, 2, by a cable or the like, 12, passing over a pulley, 13, placed at the top of the ensembles, 9. These counterweights more or less balance the weight of the truck, 1, and facilitate its movements. The extremity of the truck, 1, juxtaposed to the bases of the assemblies, 9, is provided on the side with transversely aligned rollers, 14, which roll on rails carried by the assemblies, 9, when the truck, 1, is pulled by two endless chains, 15, to which it is fastened at 16, at two transversely-spaced points the end remote from the rollers 14. Each of the chains, 15 passes about a respective pair of end pulleys 17, one of which is driven through a speed reducer, by a hydraulic motor (not shown). The feed output of the motor and consequently the speed of rotation are a function of the position of the truck, which thus controls itself, by a system of cams not shown, its own speed. In the same way the reversal of the direction of the truck is also controlled by the latter, which activates for example the contacts at the end of a run, which in turn control the deposit on the desk, 8, of the glass sheet carried by the truck, for example the sheet 18, represented by the broken lines on FIG. 2.

The desk-carrying base, 4, rests on the rails, 20, inclined from the horizontal at an angle equal to the angle of inclination from the vertical of the desk, 8, so that the desk moves in translation on and along the rails, with, its sole-piece remaining in the plane 8 b. When a sheet such as 18 is placed on the face of the desk, its lower edge activates a sensor 21 carried by the framework 2. This sensor 21 (FIGS. 4 and 5) then activates a contact that controls a hydraulic jack (not shown) to retract the truck, 4, a distance corresponding to the thickness of of a glass sheet, so that after a sequential complete cycle of the suction-cup bearing truck, 1, the latter again deposits a glass sheet very precisely in the same position as the preceding sheet, against which it leans. A jack, 22, FIG. 4, makes it possible to pivot arm 24, carrying sensor 20, around the axis of shaft, 23, when one wishes to by-pass the latter to move the base, 4, when the desk, 8, is fully loaded.

FIGS. 7 and 8 show show mechanism for elevating the sheets in sequence above the level of the feeding conveyor generally identified at 3, FIG. 1, to effect their contact with suction cups 5, of the frame, 1. The conveyor comprises belts, 25, moving on rollers, 26 and actuated by a classical system, not shown. Between the belts, 25, and at a lower level there are arranged rollers, 27, which make it possible to raise the superposed sheet and thereby elevate it into contact with nozzles, 5. For this purpose, a contact, 28, FIG. 8 is provided at the end of the conveyor, the contact controlling a pneumatic jack, 29 (FIG. 7), which, by a system of rods, 30, raises the frame, 31, carrying the rollers, 27.

The embodiment of the device according to the invention which has been briefly described makes it possible to transfer the sheets from a feeding conveyor to a handling desk, at the rate of one sheet every 14 seconds in normal operation and even one sheet per second in rapid operation, while manual handling requires about 24 seconds for a complete cycle in normal operation. It is to be noted that it is easy to reverse the arrangement of the contacts and the functioning of the cycle so that the transfer mechanisms will remove sheets from a stack, one by one and place them on the conveyor.

For this purpose, however, when each sheet is picked up on the desk, the pressure drop in the suction cups takes place in two stages. In the first, a slight pressure drop establishes contact with the upper sheet, only part of the suction cups being supplied with suction in such a way as to raise one of the corners of the sheet. Only when the sheet has been separated from the stack is maximum vacuum applied to all the suction cups.

I claim

1. Apparatus for the transfer in sequence, of sheets of material, from a conveyor to a mobile desk, comprising, a fixed horizontal frame having a longitudinal, horizontal central axis, first and second laterally spaced columns fixed with and upstanding from the forward end of said frame at opposite sides of said axis, first and second pulleys each journaled at the top of a respective one of said columns, for rotation on a common horizontal axis perpendicular to said longitudinal axis, conveyor means supporting and translating discrete sheets in succession to a terminal location beneath said frame and with one reference edge adjacent said columns and extending therebetween, a truck movable on said frame from a first horizontal position over a sheet in said terminal location, to a second and essentially vertical position between said columns, a plurality of suction cups carried by said truck in depending relation therefrom, means fixed with said frame, operable to elevate a sheet in said terminal location, into contact with said suction cups and to lift the same from said conveyor means, first and second parallel guide rails carried by said columns respectively, and extending from one terminal point each at the contiguous ends of edge of a sheet in said terminal location, upwardly and forwardly to a second terminal point atop said columns, follower means fixed with said truck at the forward end thereof, positively guided by said rails, first means connected with said truck and operable to move said follower means along said rails from said first to said second terminal points, to thereby elevate the forward end of said truck and a sheet affixed thereto, along and between said columns, said first means guiding the rearward end of said truck forwardly and downwardly, said truck and a sheet affixed thereto being essentially vertical between said columns when said follower means are positioned at said second terminal points.

2. The apparatus of claim 1, and means for optionally connecting all said suction cups to a source of vacuum.

3. The apparatus of claim 2, said first means comprising a chain, sprockets journaled on parallel axes extending between said columns at the base thereof, and at the rearward end of said frame, respectively, means connecting the rearward end of said truck to said chain, one said sprocket being power driven thereby to move said chain and truck, elevating the latter and a sheet affixed thereto, to essentially vertical position.

4. The apparatus of claim 3, said truck and a sheet affixed thereto being positioned at a delivery position upwardly and forwardly at a small acute angle, forwardly of said columns, when said follower means are at said second terminal points, track means adjacent said delivery position of said truck and inclined upwardly and rearwardly to the horizontal, at said small acute angle and in a vertical plane parallel with said longitudinal axis, a desk having a sheet-supporting base parallel with said track means, and means mounting said desk for guided translation on and along said track means, the lower edge of a sheet affixed to said truck when in delivery position, being essentially coplanar with, and over, said desk base.

5. The apparatus of claim 4, and means responsive to positioning of a sheet at said delivery position, to move said desk and base forwardly on and along said track means, by a distance essentially equal to the thickness of the sheet.

6. The apparatus of claim 1, a pulley at the top end of said columns and rotatable about a horizontal axis normal to said longitudinal axis, a cable having one end fixed to said truck and passing upwardly over and about said pulley, then downwardly, and a counterweight attached to the other and depending end of said cable.

* * * * *